United States Patent
Chang et al.

(10) Patent No.: US 10,750,068 B2
(45) Date of Patent: Aug. 18, 2020

(54) CAMERA MODULE TESTING METHOD

(71) Applicant: Primax Electronics Ltd., Taipei (TW)

(72) Inventors: Pei-Ming Chang, Taipei (TW);
Pao-Chung Chao, Taipei (TW);
Shih-Chieh Hsu, Taipei (TW);
Wei-Lung Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 22 days.

(21) Appl. No.: 16/285,630

(22) Filed: Feb. 26, 2019

(65) Prior Publication Data
US 2020/0186789 A1    Jun. 11, 2020

(30) Foreign Application Priority Data

Dec. 7, 2018 (TW) .............................. 107144182 A (51) Int. Cl.
*H04N 5/225*     (2006.01)
*G02B 7/00*      (2006.01)
*H04N 17/00*     (2006.01)

(52) U.S. Cl.
CPC .......... *H04N 5/2254* (2013.01); *G02B 7/003* (2013.01); *H04N 5/2257* (2013.01); *H04N 17/002* (2013.01)

(58) Field of Classification Search
CPC .. H04N 5/2254; H04N 17/002; H04N 5/2257; G02B 7/003
See application file for complete search history.

(56) References Cited

U.S. PATENT DOCUMENTS

| | | | |
|---|---|---|---|
| 8,259,224 B2* | 9/2012 | Kim ..................... | H04N 5/2253 348/340 |
| 2005/0285973 A1* | 12/2005 | Singh ................ | H01L 27/14618 348/374 |
| 2006/0007428 A1* | 1/2006 | Lin ........................ | G02B 27/62 356/121 |
| 2012/0293670 A1* | 11/2012 | Chan .................... | H04N 17/002 348/208.4 |
| 2015/0292867 A1* | 10/2015 | Shigemitsu .......... | H04N 17/002 348/335 |
| 2017/0330321 A1* | 11/2017 | Hsu ........................ | C12M 41/06 |

* cited by examiner

*Primary Examiner* — Shahbaz Nazrul
(74) *Attorney, Agent, or Firm* — Kirton McConkie; Evan R. Witt (57) ABSTRACT

A camera module testing method is applied to a camera module including a camera lens and a photosensitive element. In a step (A), an original image is captured through the camera lens and the photosensitive element. In a step (B), the original image is converted into a gray scale image. In a step (C), the gray scale image is converted into a binary image according to a critical gray scale value. In a step (D), a boundary contour is obtained according to plural pixels of the binary image higher than or equal to the critical gray scale value. In a step (E), a contour center of the boundary contour is obtained. Then, a step (F) is performed to judge whether an optical axis of the camera lens is aligned with an imaging center of the photosensitive element according to the imaging center and the contour center.

9 Claims, 7 Drawing Sheets

CAMERA MODULE TESTING METHOD

FIELD OF THE INVENTION

The present invention relates to an optical field, and more particularly to a camera module testing method.

BACKGROUND OF THE INVENTION

Recently, with the development of electronic industries and the advance of industrial technologies, various electronic devices are designed toward small size, light weightiness and easy portability. Consequently, these electronic devices can be applied to mobile business, entertainment or leisure purposes whenever or wherever the users are. For example, various camera modules are widely used in many kinds of fields such as smart phones, wearable electronic devices or any other appropriate portable electronic devices. Since the electronic devices are small and portable, the users can take the electronic devices to capture images and store the images according to the users' requirements. Alternatively, the images can be uploaded to the internet through mobile networks. In other words, these electronic devices not only have important commercial values but also provide more colorful lives to people. In addition to the applications on the portable electronic devices, most camera modules are applied to the vehicular electronic devices in order to meet the high safety requirements.

Figure 1:
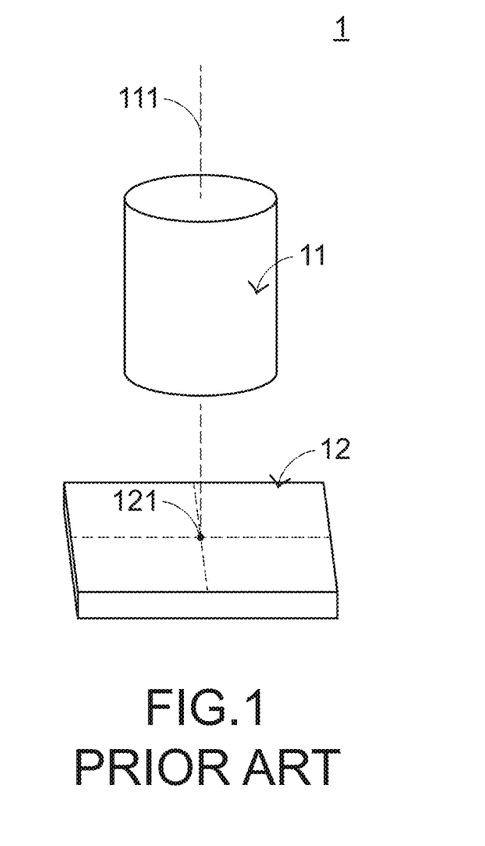
FIG. 1 schematically illustrates the concepts of a conventional camera module.

FIG. 1 schematically illustrates the concepts of a conventional camera module. The camera module 1 comprises a camera lens 11 and a photosensitive element 12. After an ambient light beam passes through the camera lens 11, the ambient light beam is projected on the photosensitive element 12. Consequently, an image is acquired. For increasing the imaging quality of the camera module 1, it is important to align an optical axis 111 of the camera lens 11 with an imaging center 121 of the photosensitive element 12. Consequently, during the process of fabricating and assembling the camera module 1, it is important to effectively test whether the optical axis 111 of the camera lens 11 is aligned with the imaging center 121 of the photosensitive element 12.

SUMMARY OF THE INVENTION

The present invention relates to a camera module testing method, and more particularly to a camera module testing method for testing whether an optical axis of a camera lens is aligned with an imaging center of a photosensitive element.

In accordance with an aspect of the present invention, there is provided a camera module testing method for a camera module including a camera lens and a photosensitive element. The camera module testing method includes the following steps. In a step (A), an original image is captured through the camera lens and the photosensitive element. In a step (B), the original image is converted into a gray scale image. In a step (C), the gray scale image is converted into a binary image according to a critical gray scale value. In a step (D), a boundary contour is obtained according to plural pixels of the binary image whose gray scale values are higher than or equal to the critical gray scale value. In a step (E), a contour center of the boundary contour is obtained. Then, a step (F) is performed to judge whether an optical axis of the camera lens is aligned with an imaging center of the photosensitive element according to the imaging center of the photosensitive element and the contour center.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a camera module testing method. The camera module testing method can be applied to the camera module 1 as shown in FIG. 1 and also applied to the production line of the camera module 1. Generally, as the position of the photosensitive element 12 is closer to the optical axis 111 of the camera lens 11, the position has higher light density. According to this feature, the camera module testing method of the present invention is specially designed. Firstly, the position of the photosensitive element 12 corresponding to the optical axis 111 of the camera lens 11 (i.e., an optical center) is searched according to the intensities of plural pixels on the photosensitive element 12. Then, a control unit of the camera module judges whether the optical axis 111 of the camera lens 11 is aligned with the imaging center 121 of the photosensitive element 12 according to a result of comparing the distance between the optical center and the imaging center 121 of the photosensitive element 12. An example of the photosensitive element 12 includes but is not limited to a complementary metal-oxide-semiconductor (CMOS) device or a charge coupled device (CCD). Preferably but not exclusively, the imaging center 121 is the center position of the entire photosensitive element 12.

Figure 2:
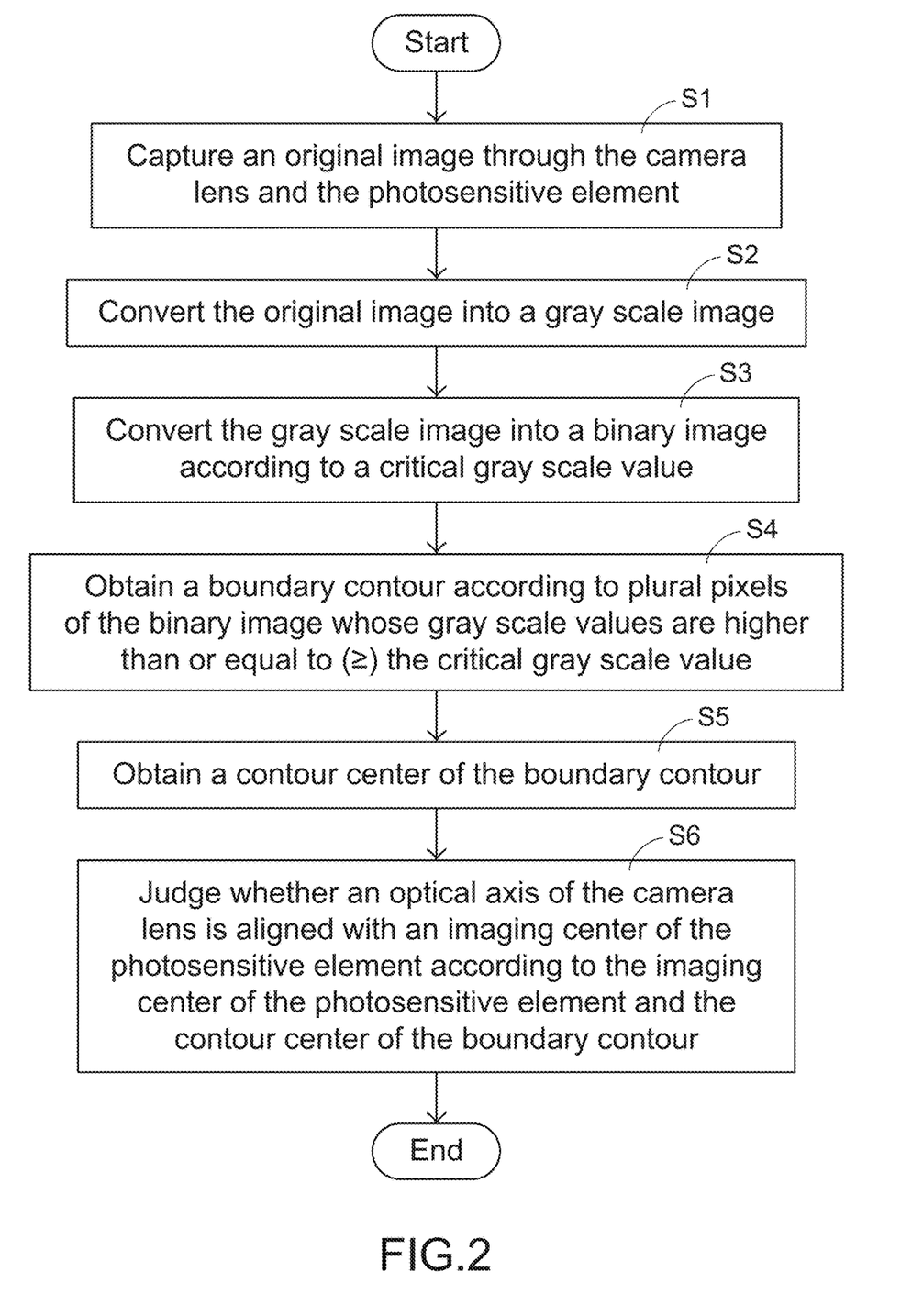
FIG. 2 is a flowchart illustrating a camera module testing method according to an embodiment of the present invention.

FIG. 2 is a flowchart illustrating a camera module testing method according to an embodiment of the present invention. The camera module testing method comprises the following steps.

In a step S1, an original image is captured through the camera lens and the photosensitive element. In a step S2, the original image is converted into a gray scale image. In a step S3, the gray scale image is converted into a binary image according to a critical gray scale value. In a step S4, a boundary contour is obtained according to plural pixels of the binary image higher than or equal to (≥)the critical gray scale value. In a step S5, a contour center of the boundary contour is obtained. A step S6 is performed to judge whether an optical axis of the camera lens is aligned with an imaging center of the photosensitive element according to the imaging center of the photosensitive element and the contour center of the boundary contour.

Hereinafter, the steps S1~S6 will be described with reference with reference to FIGS. 3~9.

Figure 3:
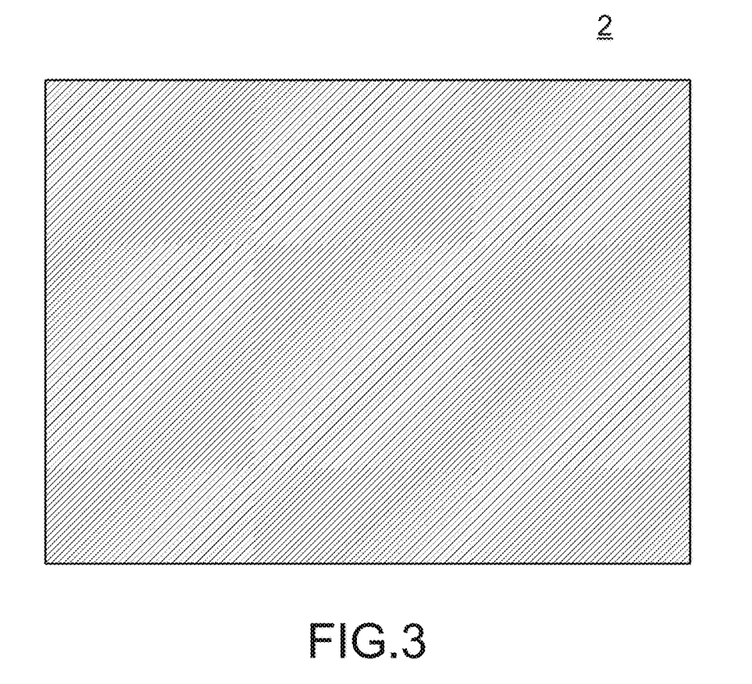
FIG. 3 is a schematic view illustrating the original image obtained through the step S1 of FIG. 2.

FIG. 3 is a schematic view illustrating the original image obtained through the step S1 of FIG. 2. For example, the original image 2 is a RGB-type color image or a CMYK-type color image.

Figure 4:
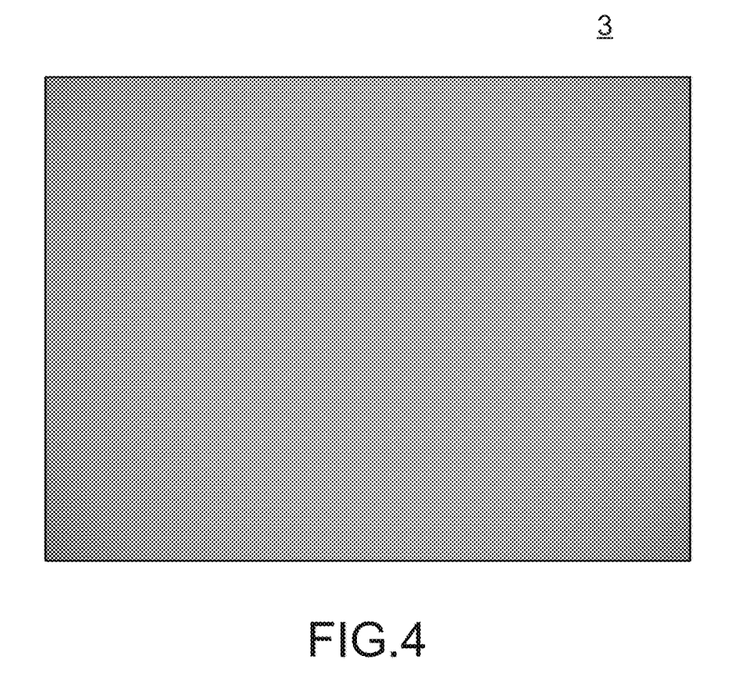
FIG. 4 is the gray scale image that is obtained from the conversion of the original image of FIG. 3 and through the step S2 of FIG. 2.

FIG. 4 is the gray scale image that is obtained from the conversion of the original image of FIG. 3 and through the step S2 of FIG. 2. Each pixel in the gray scale image 3 has a gray scale value in the range from 0 and 255. Different gray scale values denote different brightness values.

Figure 5:
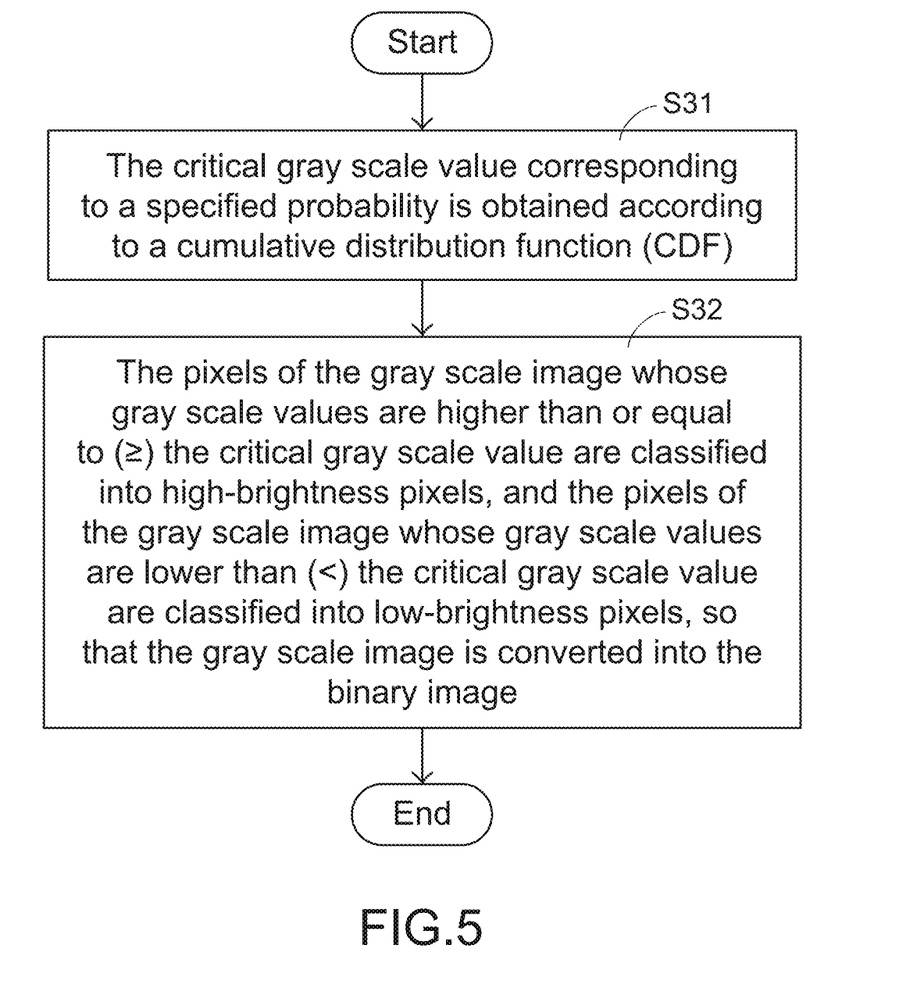
FIG. 5 is a flowchart illustrating an exemplary procedure of the step S3 FIG. 2.

FIG. 5 is a flowchart illustrating an exemplary procedure of the step S3 FIG. 2. The step S3 comprises steps S31 and S32. In the step S31, the critical gray scale value corresponding to a specified probability is obtained according to a cumulative distribution function (CDF). In the step S32, the pixels of the gray scale image 3 whose gray scale values are higher than or equal to (≥)the critical gray scale value are classified into high-brightness pixels, and the pixels of the gray scale image 3 whose gray scale values are lower than (<) the critical gray scale value are classified into low-brightness pixels. Consequently, the gray scale image is converted into the binary image.

Figure 6A:
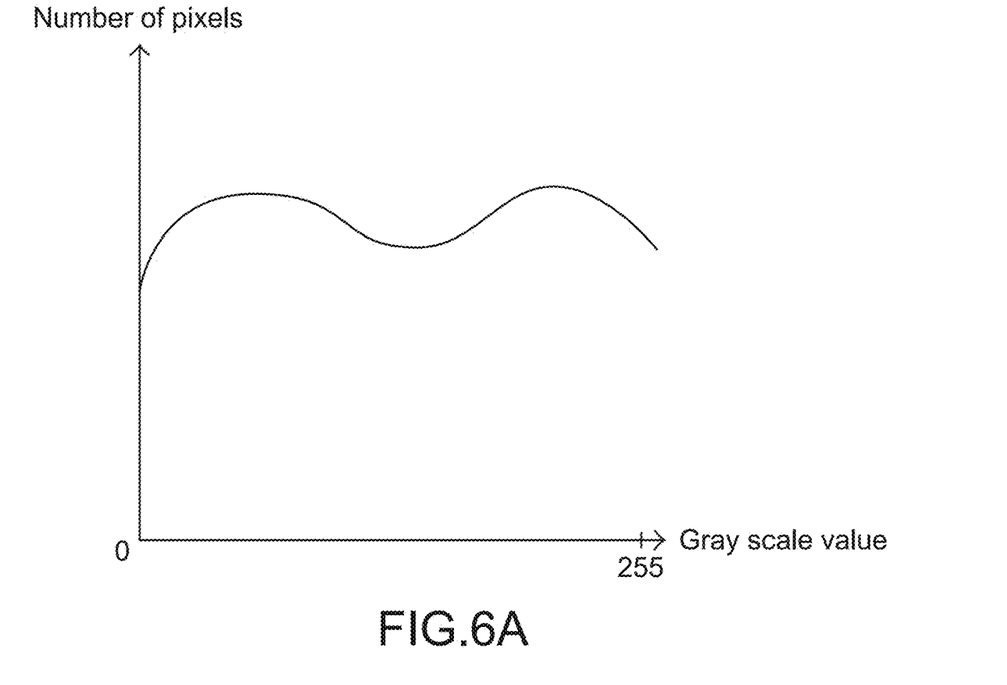
FIG. 6A is a plot illustrating the relationship between the gray scale values and the number pixels in the gray scale image as shown in FIG. 4.
Figure 6B:
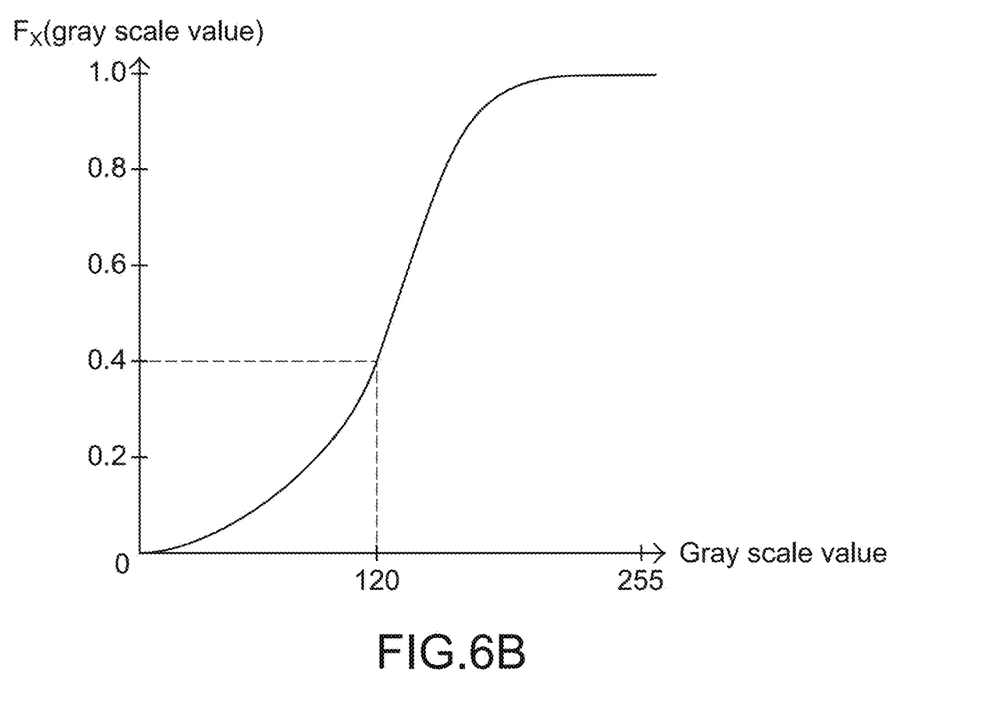
FIG. 6B is a cumulative distribution function diagram for the gray scale image as shown in FIG. 4.

Please refer to FIGS. 6A and 6B. FIG. 6A is a plot illustrating the relationship between the gray scale values (horizontal axis) and the number pixels (vertical axis) in the gray scale image. After the step S31 is completed, a cumulative distribution function diagram as shown in FIG. 6B is obtained. The cumulative distribution function may be expressed as $Fx(x)=P(X≤x)$, wherein P is probability, x is gray scale value, and X is random variable. In an embodiment, the specified probability is 0.4. It is noted that the specified probability is not restricted. As shown in FIG. 6B, the critical gray scale value corresponding to the specified probability (e.g., 0.4) is 120. That is, the critical gray scale value obtained in the step S31 of FIG. 5 is 120.

Moreover, the cumulative distribution function is the integral of a probability density function and is capable of completely describing the probability distribution of a random variable X. The associated technology is well known to those skilled in the art, and is not redundantly described herein. It is noted that numerous modifications and alterations may be made while retaining the teachings of the invention.

Figure 7:
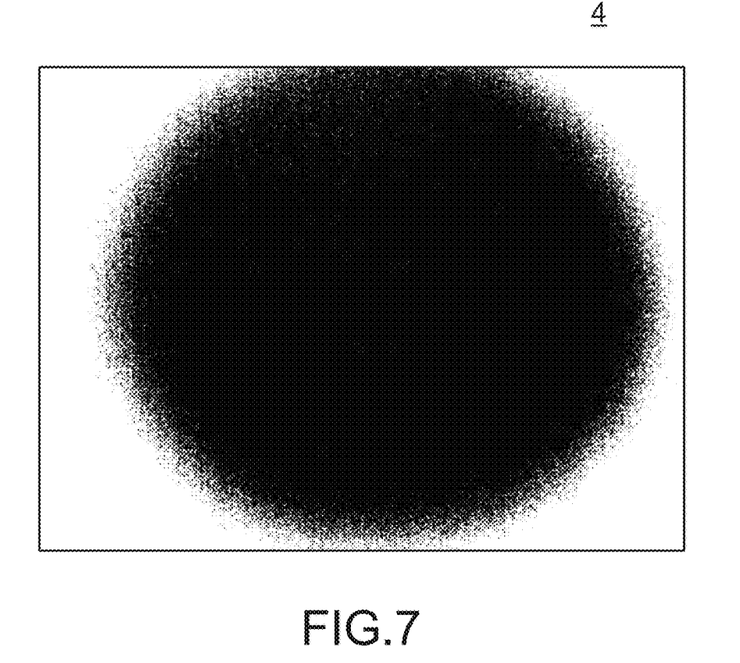
FIG. 7 is the binary image that is obtained from the conversion of the gray scale image of FIG. 4 and through the steps S31 and S32 of FIG. 5.

Then, the step S32 is performed. The pixels of the gray scale image 3 whose gray scale values are higher than or equal to (≥) 120 are classified into high-brightness pixels, and the pixels of the gray scale image 3 whose gray scale values are lower than (<) 120 are classified into low-brightness pixels. Each of the high-brightness pixels has the largest gray scale value (e.g., 255), and each of the low-brightness pixels has the smallest gray scale value (e.g., 0). Consequently, the gray scale image 3 as shown in FIG. 4 is converted into a binary image 4 as shown in FIG. 7. For clarification, the black dots in the binary image 4 as shown in FIG. 7 denote the pixels with the largest gray scale value (e.g., 255).

Figure 8:
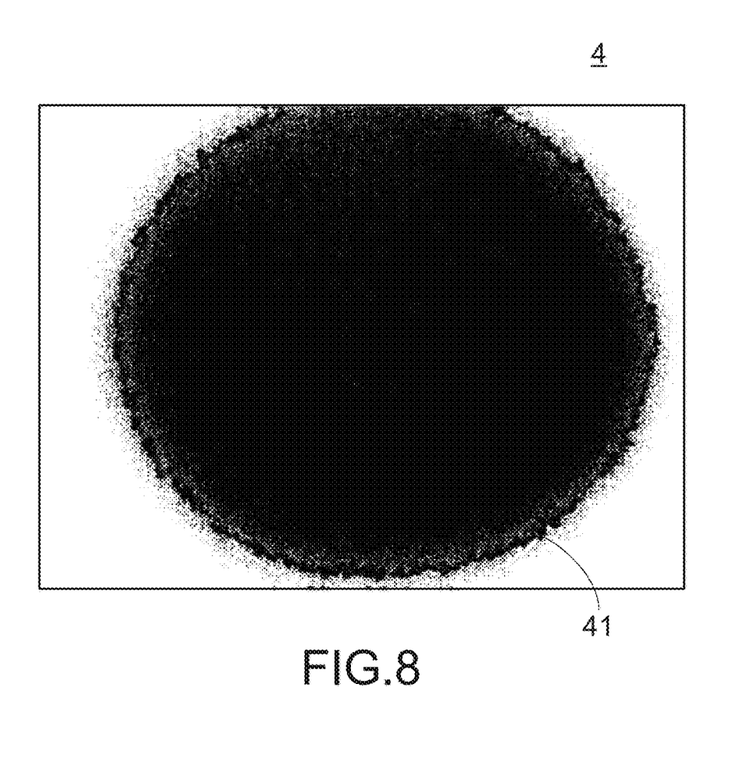
FIG. 8 schematically illustrates a boundary contour that is obtained from the binary image of FIG. 7 and through the step S4 of FIG. 2.

FIG. 8 schematically illustrates a boundary contour that is obtained from the binary image of FIG. 7 and through the step S4 of FIG. 2. In an embodiment of the step S4, the boundary contour 41 of plural pixels with the largest gray scale value (e.g., 255) in the binary image 4 is obtained according to an active contour model. The active contour model, also called snakes, is a framework for delineating an object outline from a possibly noisy 2D image. The technology of the active contour model is well known to those skilled in the art, and is not redundantly described herein. Of course, the way of obtaining the boundary contour is not restricted to the active contour model. It is noted that numerous modifications and alterations may be made while retaining the teachings of the invention.

Figure 9:
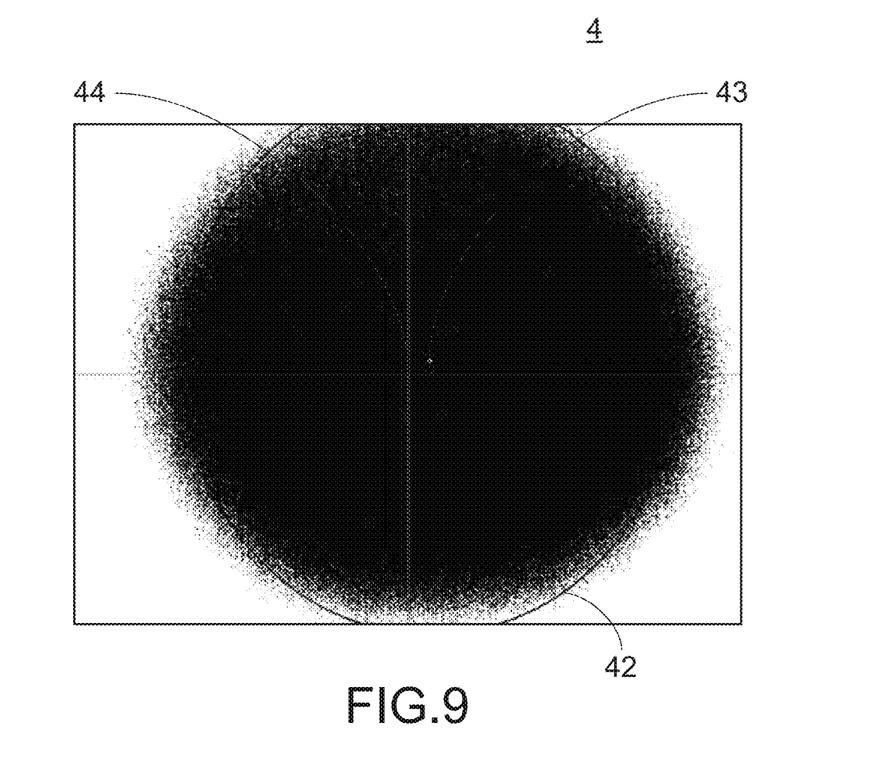
FIG. 9 schematically illustrates a contour center that is obtained from the boundary contour of FIG. 8 through the step S5 of FIG. 2.

FIG. 9 schematically illustrates a contour center that is obtained from the boundary contour of FIG. 8 through the step S5 of FIG. 2. In an embodiment of the step S5, an optical circle 42 fitted with the boundary contour 41 is obtained according to an ellipse fitting algorithm, and the center of the optical circle 42 is used as a contour center 43. Since the size of the binary image 4 matches the size of the photosensitive element 12, the contour center 43 obtained in the step S5 indicates the position of the photosensitive element 12 corresponding to the optical axis 111 of the camera lens 11 (i.e., the optical center). The technology of the ellipse fitting algorithm is well known to those skilled in the art, and is not redundantly described herein. Of course, the way of obtaining the contour center of the boundary contour is not restricted to the ellipse fitting algorithm. It is noted that numerous modifications and alterations may be made while retaining the teachings of the invention.

Moreover, since the size of the binary image 4 matches the size of the photosensitive element 12, the center 44 of the binary image 4 indicates the imaging center 121 of the photosensitive element 12. Then, the step S6 is performed to judge whether the optical axis of the camera lens is aligned with the imaging center of the photosensitive element according to the imaging center of the photosensitive element and the contour center of the boundary contour. If the distance between the center 44 of the binary image 4 (i.e., the imaging center 121 of the photosensitive element 12) and the contour center 43 of the boundary contour 41 (i.e., the position of the photosensitive element 12 corresponding to the optical axis 111 of the camera lens 11) is within a predetermined distance, it means that the imaging center 121 of the photosensitive element 12 and the position of the photosensitive element 12 corresponding to the optical axis 111 of the camera lens 11 are overlapped with each other or located near each other. Under this circumstance, it is determined that optical axis 111 of the camera lens 11 is aligned with the imaging center 121 of the photosensitive element 12. Whereas, if the distance between the center 44 of the binary image 4 (i.e., the imaging center 121 of the photosensitive element 12) and the contour center 43 of the boundary contour 41 (i.e., the position of the photosensitive element 12 corresponding to the optical axis 111 of the camera lens 11) is beyond the predetermined distance, it is determined that optical axis 111 of the camera lens 11 is not aligned with the imaging center 121 of the photosensitive element 12. Under this circumstance, it is necessary to reassemble or calibrate the camera lens 11 and the photosensitive element 12.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A camera module testing method for a camera module including a camera lens and a photosensitive element, the camera module testing method comprising steps of:
   (A) capturing an original image through the camera lens and the photosensitive element;
   (B) converting the original image into a gray scale image;
   (C) converting the gray scale image into a binary image according to a critical gray scale value;
   (D) obtaining a boundary contour according to plural pixels of the binary image whose gray scale values are higher than or equal to the critical gray scale value;
   (E) obtaining a contour center of the boundary contour; and
   (F) judging whether an optical axis of the camera lens is aligned with an imaging center of the photosensitive element according to the imaging center of the photosensitive element and the contour center.

2. The camera module testing method according to claim 1, wherein the step (C) comprises a step (C1) of obtaining the critical gray scale value corresponding to a specified probability according to a cumulative distribution function.

3. The camera module testing method according to claim 2, wherein the specified probability is 0.4.

4. The camera module testing method according to claim 2, wherein the step (C) further comprises a step (C2) of classifying plural pixels of the gray scale image, wherein the pixels of the gray scale image whose gray scale values are higher than or equal to the critical gray scale value are classified into high-brightness pixels, and the pixels of the gray scale image whose gray scale values are lower than the critical gray scale value are classified into low-brightness pixels.

5. The camera module testing method according to claim 1, wherein in the step (D), the boundary contour is obtained according to an active contour model.

6. The camera module testing method according to claim 1, wherein in the step (E), an optical circle fitted with the boundary contour is obtained according to an ellipse fitting algorithm, and a center of the optical circle is used as the contour center.

7. The camera module testing method according to claim 1, wherein if the imaging center and the contour center are overlapped with each other or located near each other, a result of the step (F) indicates that the optical axis is aligned with an imaging center.

8. The camera module testing method according to claim 1, wherein the camera module testing method is applied to a production line of the camera module.

9. The camera module testing method according to claim 1, wherein the photosensitive element is a complementary metal-oxide-semiconductor (CMOS) device or a charge coupled device (CCD).

* * * * *